United States Patent [19]
Torpie

[11] 3,920,898
[45] Nov. 18, 1975

[54] NON-SYNCHRONOUS DUOBINARY ENCODING

[75] Inventor: John D. Torpie, Dallas, Tex.

[73] Assignee: Xerox Corporation, Stamford, Conn.

[22] Filed: May 30, 1974

[21] Appl. No.: 474,751

[52] U.S. Cl. ............ 178/68; 178/DIG. 3; 307/209; 325/38 A
[51] Int. Cl.$^2$ ............................................ H04N 7/00
[58] Field of Search ..................... 178/DIG. 3, 63, 6; 307/209, 261; 328/34; 325/38 A

[56] References Cited

UNITED STATES PATENTS

| | | | |
|---|---|---|---|
| 2,700,696 | 1/1955 | Barker | 307/209 |
| 3,806,639 | 4/1974 | Evans | 178/DIG. 3 |

*Primary Examiner*—George H. Libman

[57] ABSTRACT

To provide spectrum compression for non-synchronous data signals, there is a method and means for carrying out a two-to-three level encoding process in which the encoding polarity for each excursion of the data signal from a predetermined level is selected as a function of (1) the encoding polarity for any immediately preceeding excursion and (2) the interval of time between those excursions. This encoding technique may be used to advantage in, for example, limited bandwidth facsimile systems to encode the baseband signal in a manner which not only provides substantial spectrum compression, but which also virtually forces the system to respond to single, isolated, black picture elements. Specifically, for that application, the timing is selected so that the white picture elements at opposite sides of any single, isolated, black picture element are encoded with opposite polarities.

16 Claims, 4 Drawing Figures

NON-SYNCHRONOUS DUOBINARY ENCODING

BACKGROUND OF THE INVENTION

This invention relates to the transmission of non-synchronous data signals over limited bandwidth transmission channels and, more particularly, to methods and means for compressing the spectrum of non-synchronous facsimile signals.

The mounting demand for rapid and accurate communications of graphic information (e.g., written and printed material, drawings, sketches, etc.) has led to the development of facsimile systems which are capable of providing a remote location with a more or less exact replica or "facsimile" of a subject copy in a matter of just a few minutes. To that end, the typical facsimile system includes a transmitting terminal for converting the information content of the subject copy into a video signal, a transmission channel for carrying that signal (or, more commonly, a carrier modulated in accordance with it) to the remote location, and a remotely located receiving terminal for printing the facsimile copy in response to the video signal.

Document transmission time and resolution are important performance parameters of such systems. The first is a measure of the amount of time required for generating the facsimile copy, and the other is a measure of the quality of that copy. Ideally, the document transmission time is minimized and the resolution is maximized. Generally, however, those goals are inconsistant because facsimile communications are usually carried out over limited bandwidth transmission channels. For example, the public switched telephone network has become a favored transmission media for facsimile because subscribers may rely on it for a communications link to or from almost any point. Those links are, however, bandwidth limited. For example, the usual voice grade telephone link has an available bandwidth of only 3 KHz. or so.

Nyquist's rule dictates the maximum permissible data transmission rate for a limited bandwidth channel. A generalized expression of that rule for a low pass channel is:

$$\frac{c}{f_1} = 2 \log_2 b \text{ bits per second/cycle of bandwidth}$$

where:

$c$ = bits per second;
$f_1$ = the cut-off frequency of the channel; and
$b$ = the number of discrete signalling levels for the data The equivalent expression for a full sideband carrier system is:

$$\frac{c}{f_1} = \log_2 b \text{ bits per second/cycle of bandwidth}$$

Others seeking improved transmission efficiencies for facsimile and the like have proposed so-called spectrum compression techniques involving two-to-three level pretransmission encoding and three-to-two level post-transmission decoding. Specifically, random alternate encoding and dibinary encoding have both been used with some success for compressing the spectrum of non-synchronous two level data, such as facsimile signals, so that increased data transmission rates can be realized without violating Nyquist's rule.

Random alternate encoding is carried out by reversing the polarity of the encoded signal in response to each successive excursion of the original signal from its reference level of, say, 0 volts. It yields only a slight degree of spectrum compression for the usual facsimile signal, but it provides substantial assurance that the reference level portions of the original signal will be recovered during the decoding process. Indeed, the rules for this type of encoding ensure that the reference level portions of the original signal reside between opposite polarity portions of the encoded signal, thereby virtually forcing a response to the first mentioned portions of the signal.

The rules for dibinary encoding, on the other hand, call for random selection of the polarity for the encoded signal in response to each successive excursion of the original signal from its reference level. The reference level portions of the original signal are unaffected by the encoding process. Moreover, there is an even probability that the counterpart in the encoded signal for anyone of the excursions of the original signal will be positive or negative relative to the reference level. Substantial spectrum compression is, therefore, achieved inasmuch as the encoded signal has only one half of the bandwidth of the original signal, regardless of the power density spectrum of the original signal. However, there is no assurance that the reference level portions of the original signal will be recovered during the decoding process. The problem is that the polarity of the encoded signal may remain unchanged while the original signal is making two or more sequential excursions from its reference level, thereby creating a risk in a limited bandwidth environment of a non-response to the intervening reference level portion of the signal, especially if there is only a short period of time separating the two excursions.

SUMMARY OF THE INVENTION

In contrast with the prior art, an important object of the present invention is to provide methods and means for carrying out a two-to-three level encoding process which yields substantial spectrum compression while aiding in preserving the information content of the encoded signal. In other words, an object is to provide a two-to-three level encoding technique which combines the desirable features of random alternating encoding and dibinary encoding.

More particularly, an object of this invention is to provide methods and means for encoding non-synchronous facsimile signals in accordance with a two-to-three level encoding rule which not only provides substantial spectrum compression but which also ensures that single black elements are easily and reliably recovered from the encoded signal.

Another object of the instant invention is to provide reliable and readily implemented methods and means for carrying out two-to-three level encoding process having the aforementioned characteristics.

Specifically, an object of this invention is to provide an alternate to the two-to-three level encoding technique described and claimed in a concurrently filed and commonly assigned United States patent application Ser. No. 474,752, on "Time Dependent Two-to-Three Level Alternate Encoding."

To achieve these and other goals, a clock controlled two-to-three level encoder has been provided for en coding data signals. In accordance with this invention, the encoded signal is held at a mid-level and counts are periodically accumulated whenever the applied data signal is at a predetermined reference level. Furthermore, the polarity of the encoded signal is set positive or negative relative to the mid-level in response to each excursion of the data signal from its reference level as a function of (1) the encoding polarity selected for any immediately preceeding excursion and (2) the number of counts accumulated during the intervening interval of time. A suitable encoding rule calls for retaining or reversing the prior polarity setting depending on whether an even or odd number of counts has been accumulated.

Special advantages flow from using this invention for pre-transmission encoding of non-synchronous baseband signals in limited bandwidth facsimile systems. Specifically, substantial spectrum compression may be achieved, without significant risk of the system failing to respond to image information in the baseband signal. For example, if the encoded signal has its mid-level dedicated to the black picture elements of the baseband signal and its upper and lower levels dedicated to the white picture elements and if counts are accumulated during each run of black picture elements at one-half the picture element rate, the aforementioned encoding rule not only halves the spectrum of the baseband signal but also causes the white picture elements on opposite sides of any single, isolated, black picture element to be encoded with opposite polarities, thereby vitrually forcing the system to respond to even the smallest significant bits of image information.

BRIEF DESCRIPTION OF THE DRAWINGS

Still further objects and advantages of the present invention will become apparent when the following detailed description is read in conjunction with the attached drawings, in which.

DETAILED DESCRIPTION OF THE ILLUSTRATED EMBODIMENT

While the invention is described in some detail hereinafter with specific reference to an exemplary embodiment, it is noteworthy that there is no intent to limit it to that embodiment. On the contrary, the aim is to cover all modifications, alternatives, and equivalents falling within the spirit and scope of the invention as defined by the appended claims.

Figure 1:
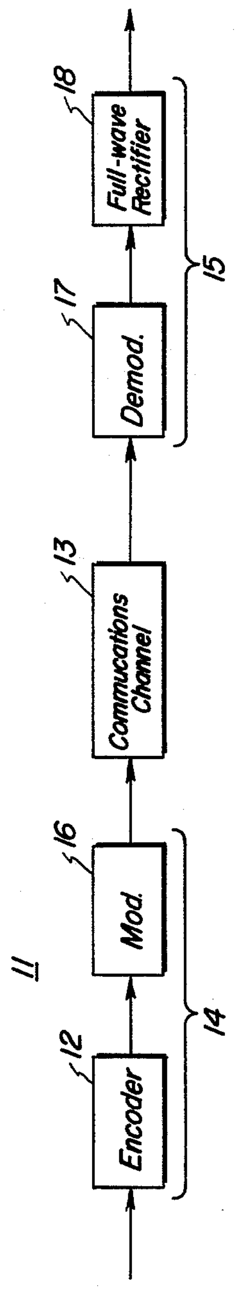
FIG. 1 is a block diagram of a limited bandwidth facsimile system in which the encoder of this invention may be used to advantage.

Turning now to the drawings, and at this point especially to FIG. 1, it will be seen that there is a limited bandwidth facsimile system 11 having a two-to-three level encoder 12 constructed in accordance with the present invention. As shown, the facsimile system 11 comprises a limited bandwidth communications channel 13 for interconnecting a transmitting terminal 14 and a receiving terminal 15. Conventionally, the communications channel 13 is provided on a demand basis by, say, the public switched telephone network. To simplify this disclosure, however, attention will be focused on the conditions existing while facsimile communications are taking place.

Specifically, in operation, the information content of a subject copy (not shown) is converted (by means not shown) into a baseband video signal. That signal is encoded by the encoder 12, and the encoded signal is then applied to a modulator 16 so that the output from the transmitting terminal 14 is a carrier signal modulated in accordance with the encoded baseband signal. The modulated signal is routed to the receiving terminal 15 by the communications channel 13. There, a demodulator 17 recovers the encoded baseband signal from the modulated carrier, a decoder 18 then recovers the baseband signal from the encoded signal, and finally a printer (not shown) prints a facsimile of the subject copy in response to the received baseband signal.

The encoder 12 is unique, but the decoder 18 may be a conventional three-to-two level decoder, such as a full wave rectifier. Indeed, no special changes need be made to existing facsimile systems and the like with spectrum compression to accomodate the encoder 12.

Figure 2:
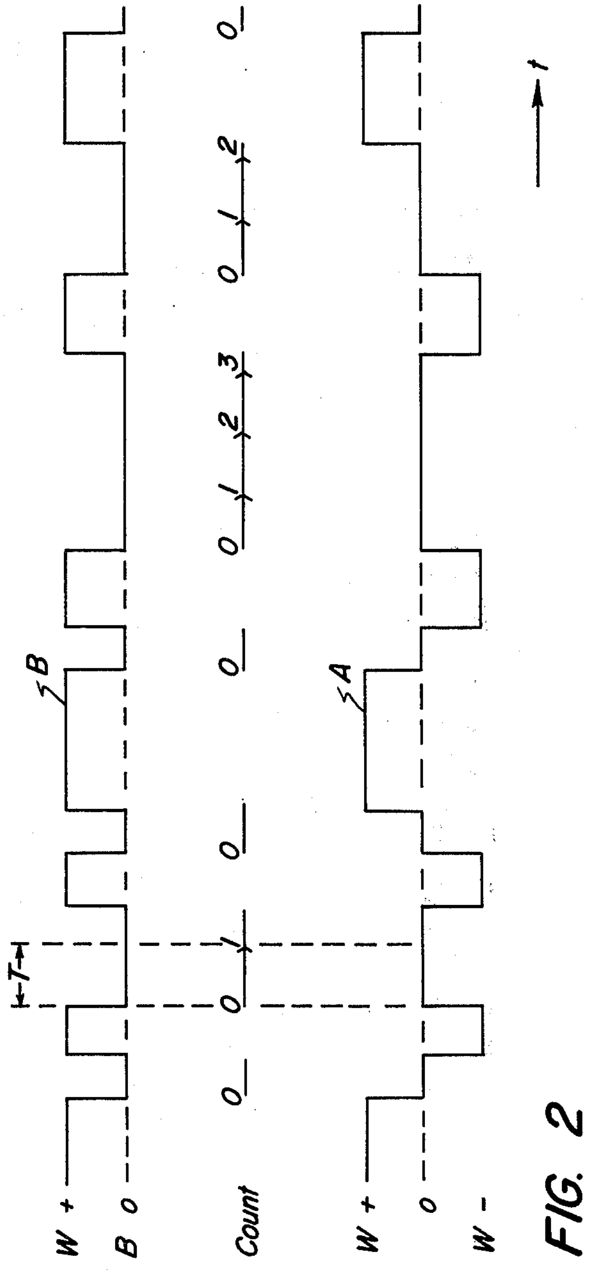
FIG. 2 is a timing chart illustrating an encoding rule which is advantageously utilized in the system shown in FIG. 1.

Referring to FIG. 2 for a generalized review of the rules for two-to-three level encoding in accordance with this invention, it will be seen that the encoded signal A is held at a mid-level whenever the data signal B is at its reference level, much in the same manner as in other two-to-three level encoding techniques. As opposed to those techniques, however, the polarity for the encoded signal A is set in response to each excursion of the data signal B from its reference level as a function of (1) the elapsed time since the completion of any prior excursion and (2) the polarity setting used to encode the prior excursion. Readers familiar with what is commonly referred to as "synchronous duobinary encoding" may recognize some similarities and, therefore, the encoding technique of this invention may be conveniently referred to as "non-synchronous duobinary," thereby emphasizing that the polarity of the encoded signal A is set solely in dependence on the characteristics of the data signal B, which is typically a non-synchronous signal subject to more or less random variations.

In keeping with an important feature of this invention, substantial spectrum compression is achieved, regardless of the power density spectrum of the data signal B. To that end, each reference level run of the data signal B is divided by clock pulses or the like into a series of relatively short increments of time T which are, in turn, counted to determine whether the polarity of the encoded signal A should or should not be reversed in response to the next excursion of the data signal B from its reference level. A precise count need not be maintained because the controlling factor in determining whether the polarity of the encoded signal A is to be reversed or not is whether the data signal B departs from its reference level on an odd or even count. It follows, therefore, that the count for each reference level run of the data signal B need only be accumulated on an alternating odd and even basis.

As shown, the data signal B is a binary facsimile baseband signal having one voltage level for the black or image areas of the subject copy and another voltage level for the white or background areas. Neverthe less, it will be appreciated that the principles of this invention are also applicable to analog systems, such as facsimile systems with gray scale.

Figure 3:
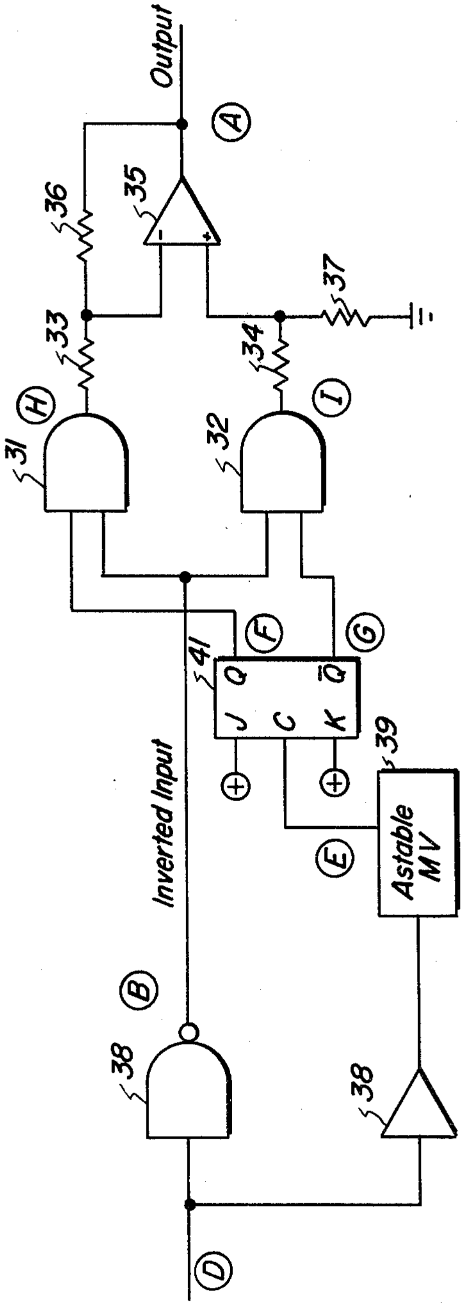
FIG. 3 is an electrical schematic of an encoder constructed in accordance with this invention.
Figure 4:
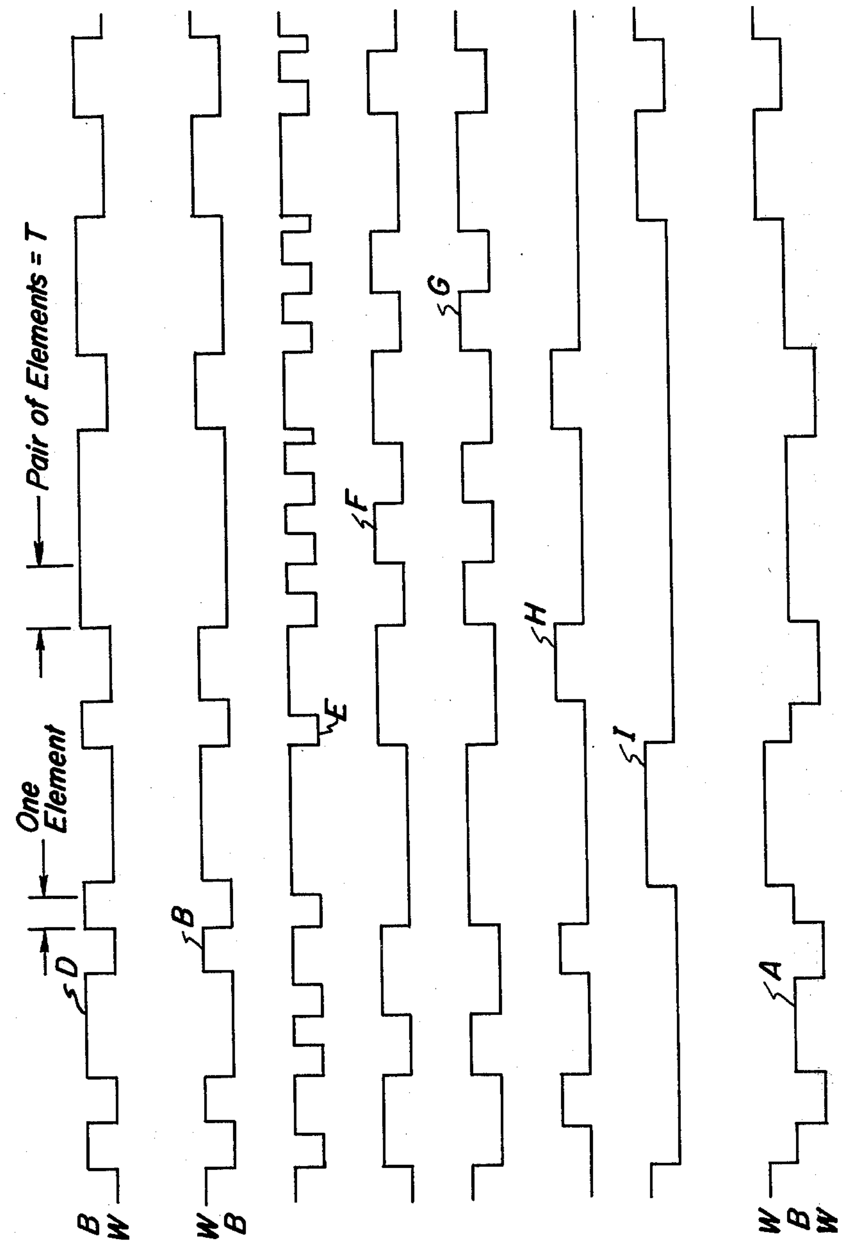
FIG. 4 is a timing chart for the encoder shown in FIG. 4.

Referring to FIGS. 3 and 4 for additional details, the input signal D for the encoder 12 is typically a classical facsimile baseband signal having a positive voltage level for the image areas (i.e., the "black" picture elements) of the subject copy and a reference, say, zero voltage level for the background areas (i.e., the "white" picture elements). Each picture element of the baseband signal D is, of course, allotted a predetermined amount of time. One of the most serious obstacles to faithful reproduction of the subject copy in a limited bandwidth system is the relatively high probability that the system will fail to respond to single, isolated, black picture elements. For that reason, the encoded signal A is preferably a white-black-white signal or, in other words, has its upper and lower voltage levels dedicated to the white picture elements and its midlevel dedicated to the black picture elements. Indeed, in accordance with one of the more detailed aspects of this invention, the encoding is carried out so that the white picture elements straddling any single, isolated, black picture element are encoded with opposite polarities, thereby virtually forcing the system to respond to any isolated bits of image information.

More particularly, as illustrated, the encoder 12 comprises a pair of AND gates 31 and 32 which have their outputs separately coupled by resistors 33 and 34 to the inverting and non-inverting inputs, respectively, of a unity gain operational amplifier 35. That amplifier, which characteristically has a feedback resistor 36 between its output and its inverting input and a drift stabilizing resistor 37 in the ground return path for its non-inverting input, is selectively operated under the control of output signals H and I from the AND gates 31 and 32, respectively, in its inverting, non-inverting and quiescent modes to generate the encoded signal A.

A white-black-white encoding format is achieved by using an inverter 38 for applying an inverted version of the baseband signal D to one input of each of the AND gates 31 and 32. The inverted baseband signal B (like the aforementioned and identically referenced data signal) has a positive voltage level for the white picture elements and a reference or zero voltage level for the black picture elements. As will be seen, one or the other of the AND gates 31 and 32 is enabled whenever a run of white picture elements is being received so that the operational amplifier 35 then operates in its inverting or non-inverting modes. But, when a run of black picture elements is in progress, the inverted baseband signal B disables both of the AND gates 31 and 32. The result, of course, is that the operational amplifier 35 operates in its quiescent mode to encode the black picture elements.

The encoding polarity for each run of white picture elements is selected as a function of (1) the encoding polarity for any preceding white run and (2) the duration of the intervening black run. To carry that out, there is a buffer 38 for applying the baseband signal D to the input of an astable multi-vibrator 39 and a bistable means, such as a J-K flip-flop 41, having a clock input coupled to the output of the multivibrator 39 and a pair of complementary outputs Q and Q separately coupled to the remaining or second inputs of the AND gates 31 and 32, respectively. In operation, the multivibrator 39 oscillates at a predetermined frequency in response to the positive portions of the baseband signal D to supply one or more negative-going clock pulses E during each run of black picture elements. The operating state of the flip-flop 41 reverses in response to the leading edge of each of the clock pulses E and, hence, the signals F and G appearing at the Q and Q outputs, respectively, of the flip-flop 41 cyclically and complementarily switch between high ("1") and low ("0") logic levels at the clock pulse rate, starting at the outset of each black run and continuing until the next white run. The output signals F and G, in turn, alternately inhibit the AND gates 31 and 32 so that only one of them is enabled when the inverted baseband signal B goes high at the beginning of a white run. At that point, the multivibrator 39 ceases to oscillate, thereby latching the flip-flop 41 in its existing state until the next black run.

As will be appreciated, successive white runs are encoded with the same or opposite polarities depending on whether an odd or even number of clock pulses E are generated during the intervening black run. In effect, the flip-flop 41 and the AND gates 31 and 32 accumulate or count the clock pulses E provided during each black run to set the encoding polarity for the next white run. Of course, since the leading edge of the first clock pulse E for each black run is substantially coincidental with the start of the run, the encoding may be easily structured so that the white picture elements on opposite sides of any single, isolated, black picture elements are encoded with opposite polarities. To accomplish that, in keeping with one of the detailed features of this invention, the period for the clock pulses E is selected to be twice the amount of time allotted to each picture element.

CONCLUSION

In view of the foregoing, it will now be apparent that this invention provides a method and means for carrying out a two-to-three level encoding process which not only yields substantial spectrum compression, but which also aids in preserving the information content of the encoded signal. It will be understood that certain aspects of the invention are especially significant to the encoding of non-synchronous baseband signals in limited bandwidth facsimile systems. At the same time, however, it will be appreciated that the broader features of the invention are not limited to any specific type of system.

What is claimed is:

1. An encoder for encoding data signals of the type that make successive excursions from a predetermined level as a function of time; said encoder comprising the combination of bipolar means selectively operable in inverting, non-inverting, and quiescent modes; and control means coupled to said bipolar means for controlling the operating mode thereof in response to said data signal; said control means including first means for holding said bipolar means in said quiescent mode whenever said data signal is at said predetermined level, and second means for selectively operating said bipolar means in said inverting and non-inverting modes during said excursions, said second means selecting the operating mode for each of said excursions as a function of the operating mode selected for any immediately preceding excursion and the amount of time elapsed since said preceeding excursion.

2. The encoder of claim 1 wherein said bipolar means comprises an operational amplifier having inverting and non-inverting inputs; said control means comprising first and second gates having outputs coupled to the inverting and non-inverting inputs, respectively, of said operational amplifier; said first means applies a disabling signal to one input of each of said gates whenever said data signal is at said predetermined level; and said second means has first and second complementary outputs coupled to further inputs of said first and second gates, respectively, whereby one of said gates is enabled and other is disabled during each excursion of said data signal from its reference level.

3. The encoder of claim 2 wherein said second means comprises a bistable device to provide said complementary outputs, and means for applying clock pulses at a predetermined repetition rate to said bistable device whenever said data signal is at said predetermined level to thereby cyclically switch said bistable device between one operating state and another while said data signal is at said level.

4. The encoder of claim 3 wherein said second means further includes an astable multivibrator for supplying said pulses, starting substantially coincidentally with said data signal going to said predetermined level and continuing thereafter at said predetermined rate until said data signal departs from said level.

5. In a limited bandwidth facsimile system including means for supplying a non-synchronous baseband signal having runs of unknown length at first and second levels to represent black and white picture elements, respectively, a two-to-three level encoder comprising the combination of bipolar means selectively operable in inverting, non-inverting and quiescent modes for generating an encoded version of said baseband signal; and control means coupled to said bipolar means for controlling the operating mode thereof in response to said baseband signal; said control means including first means for holding said bipolar means in said quiescent mode whenever said baseband signal is at one of said levels, and second means for selectively operating said bipolar means in one or the other of said modes whenever said baseband signal is at the other of said levels, said second means selecting the operating mode of said bipolar means for each run of said baseband signal at said other level as a function of the operating mode selected for any immediately preceeding run at said other level and the length of any intervening run at said one level.

6. An encoder according to claim 5 wherein said control means comprises first and second gates which are simultaneously disabled by said first means when said baseband signal is at said one level and selectively enabled and disabled by said second means when said baseband signal is at said other level.

7. An encoder according to claim 6 wherein each of said gates has a first input and a second input, said first means applies a disabling signal to the first input of each of said gates whenever said baseband signal is at said one level; and said second means includes a clock controlled bistable device having complementary outputs coupled to the second inputs of said first and second gates, respectively, for alternately and cyclically applying an inhibiting signal to one and then the other of said gates whenever said baseband signal is at said one level, whereby one of said gates is enabled and the other is disabled when said baseband signal goes to said other level.

8. An encoder according to claim 7 wherein each of said picture elements is allotted a predetermined amount of time; and said bistable device cycles with a period selected to equal twice the amount of time allotted to each picture element, starting substantially coincidentally with said baseband signal going to said one level and continuing thereafter until said baseband signal goes to said other level.

9. An encoder according to claim 8 wherein said one and said other levels represent black and white picture elements, respectively, whereby white picture elements straddling any single, isolated, black picture element are encoded with opposite polarities, thereby virtually forcing the system to respond to isolated black picture elements.

10. An encoder according to claim 6 wherein said bipolar means comprises a unity gain operational amplifier having an inverting input coupled to an output of said first gate and a non-inverting input coupled to an output of said second gate.

11. An encoder according to claim 10 wherein each of said gates has a first input and a second input; said first means applies a disabling signal to the first input of each of said gates whenever said baseband signal is at said one level; and said second means includes a clock controlled bistable device having complementary outputs coupled to the second inputs of said first and second gates, respectively, for alternately and cyclically applying an inhibiting signal to one and then the other of said gates whenever said baseband signal is at said one level, whereby one of said gates is enabled and the other is disabled when said baseband signal goes to said other level.

12. An encoder according to claim 11 wherein each of said picture elements is allotted a predetermined amount of time; and said bistable device cycles with a period selected to equal twice the amount of time allotted to each picture element, starting substantially coincidentally with said baseband signal going to said one level and continuing thereafter until said baseband signal goes to said other level.

13. An encoder according to claim 12 wherein said one and said other levels represent black and white picture elements, respectively, whereby white picture elements straddling any single, isolated, black picture element are encoded with opposite polarities, thereby virtually forcing the system to respond to isolated black picture elements.

14. A method for generating a three level encoded signal in response to a non-synchronous data signal having runs of unknown length at first and second levels; said method comprising the steps of adjusting said encoded signal to a selected one of an upper level and a lower level as said data signal goes to said first level;

setting said encoded signal to a level intermediate said upper and lower levels as said data signal goes to said second level;

periodically accumulating counts while said data signal is at said second level; and readjusting said encoded signal to said one or to the other of said upper and lower levels depending on whether the accumulated count is odd or even when the data signal next goes to said first level.

15. The method of claim 14 wherein a first count is accumulated substantially simultaneously with said data signal going to said second level, and said encoded signal is readjusted to said one level if the accumulated count is even when said data signal goes to said first level and to said other level if the accumulated count is odd.

16. The method of claim 15 wherein said data signal is a facsimile baseband signal having white picture elements represented by said first level and black picture elements represented by said second level, with each of said picture elements being allotted a predetermined amount of time; and said counts are accumulated, starting at the outset of each run at said second level and continuing thereafter, with a period selected to equal twice the amount of time allotted to each picture element, until said baseband signal goes to said first level; whereby white picture elements straddling any single, isolated, black picture elements are encoded at different ones of said upper and lower levels.

* * * * *